UNITED STATES PATENT OFFICE.

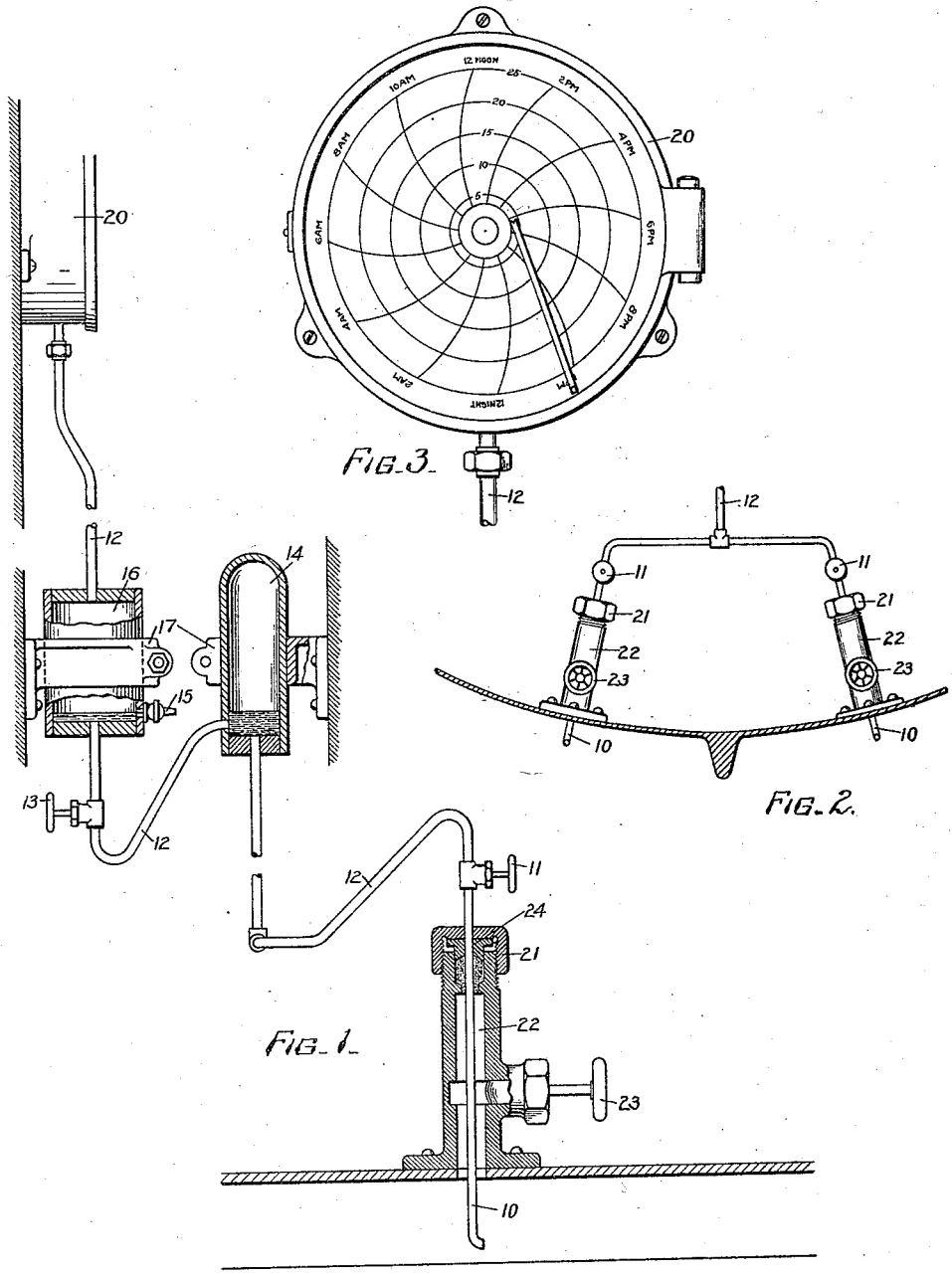

FRANK B. SANBORN, OF CAMBRIDGE, MASSACHUSETTS.

SYSTEM FOR INDICATING THE SPEED OF BOATS.

1,407,172.

Specification of Letters Patent.   Patented Feb. 21, 1922.

Application filed November 22, 1918.   Serial No. 263,708.

*To all whom it may concern:*

Be it known that I, FRANK B. SANBORN, a citizen of the United States, and a resident of Cambridge, in the county of Middlesex and State of Massachusetts, have invented a new and Improved System for Indicating the Speed of Boats, of which the following is a specification.

My invention relates to a system for indicating the speed of boats through water. The system consists of a means for receiving water pressure, pressure tubing, an indicating and recording gage, and a compensating chamber which enables the indicating and recording gage to be placed at any elevation in the boat, and still indicate the correct speed of the boat.

Heretofore it has been customary to place the indicating and recording gage at the level of the surface of the water, or, when it was desired to place said gage at a higher level, to employ a float chamber within which the variations in water levels due to the speed of the boat would actuate a float that was connected to an indicating and recording gage; or, employ a chamber containing a flexible member, for example, a rubber diaphragm, that would have a sealed compartment on one side and be open to liquid pressure on the other; when the flexible member became actuated by the liquid pressure acting at the open side it would transmit a part of this pressure by means of fluid contained in the sealed compartment on the opposite side, through piping that would connect to an indicating and recording gage that could be placed at the desired elevation.

The use of a compartment sealed by a rubber diaphragm is objectionable since defects are apt to occur in the diaphragm which interfere with the effectiveness of the sealed compartment, and floats are apt to become pervious and as the depths of flotation vary, errors develop in indications of the speed of the boat. My invention overcomes these defects by requiring no rubber diaphragm, nor float.

Among other devices heretofore used for determining the speed of boats, have been methods of utilizing the speed of the boat to cause a continuous rate of flow of water, which rate of flow when measured would be an index of the speed of the boat; usually an inlet tube faces forward as a receiving means and as the tube moves through the water a continuous flow of water passes through some gaging device like an orifice, or a revolving element like a propeller; but since a continuous flow is required difficulties are often encountered due to obstructions that either check the flow, or the revolutions of the parts, and cause incorrect indications of the speed of the boat.

In my system, water tries to enter the means for receiving water pressure and it creates a pressure against the column of water that is confined in a part of the pressure tubing and within the compensating chamber; which pressure is further transmitted to the air, that is confined in the pressure tubing, and operates on the indicating and recording gage. Thus a pressure action is utilized and not a continuous flow so that obstructions rarely occur.

My invention is illustrated by the accompanying drawing, in which—

Figure 1 is a longitudinal side elevation of my invention as frequently applied to indicate the speed of boats, portions being shown in vertical section; Fig. 2, a transverse section at the turning point of a boat through the lower portion of the hull of a boat showing the position of the means for receiving water pressure; Fig. 3, an enlarged front view of the indicating and recording gage.

As the boat travels forward water tries to enter one, or both, of the means for receiving water pressure 10 10, both of which are controlled by valves 11 11, and water pressure is transmitted through pressure tubing 12, and air chamber 14, to the compensating chamber 16. Air that is contained therein, in pressure tubing 12, and in a part of the indicating and recording gage 20, is compressed, and air pressure caused by the speed of the boat is thus transmitted to the indicating and recording gage 20.

By use of the compensating chamber 16, the indicating and recording gage 20, may be placed at any desired elevation in the boat; because the volume of air confined in the compensating chamber 16 is much larger than the volume of air that is confined in the pressure tubing 12, and the rest of the parts. Therefore when fluid tries to enter the compensating chamber 16, which has a volume much larger than the rest of the air system and has a comparatively large volume with small vertical height, as the confined air becomes compressed, the elevation of water in the compensating chamber varies only a limited amount; whereas, it would vary a disturbing amount if no compensating chamber were used and a pressure tubing of uniform section existed. The weight of air for varying lengths of pressure tubing does not materially effect the readings that are obtained; for example the size of the pressure tubing commonly used has an inside diameter of 1/8 inch; if the length and vertical elevation of the pressure tubing be 100 feet the total weight of air contained therein would be .0007 pound and the weight per square inch of area would be .06 pound, but at the base of the air column a pressure of water would be created of 5 pounds per square inch when the boat had a speed of 20 miles per hour. Thus the air column for 100 feet in height would be only 1/83 of the water pressure at 20 miles per hour and would have a slight effect on the indications and readings. For these reasons in actual practice the indicating and recording gage may be placed at any convenient location above, or below, the water line. The air in the chamber 14 furnishes a cushion, which will absorb a considerable portion of the fluctuations of pressure in the system caused by abrupt movements of the vessel, before these can be communicated through the lateral pipe 12 to the compensating chamber and gage and produce irregularities in the record.

In order to compensate for variations in the depts of water that the boat draws under different loads, an adjustment of compensating chamber 16 may be made by loosening clamp 17, which holds the compensating chamber 16 and connecting parts to the supporting parts of the boat, and then raising or lowering as required the compensating chamber 16 and its connections. The desired elevation may be determined by testing with pet cock 15; when water will slowly flow out of pet cock 15, the inlet or bottom end of the compensating chamber 16 is at the water level. This location of the compensating chamber relative to the water surface is used when calibrating the indicating and recording gage. The same relative position of the compensating chamber 16 can be secured when the boat has different loads and depths of draft and thus the indicating and recording gage will receive the same pressure for the same speed even when the boat is differently loaded. To maintain the correct relation to the compensating chamber, the cushioning chamber 14 is arranged to be similarly adjusted.

In order to free the means for receiving water pressure 10 10, of obstructions that may occur, they may be removed, cleared and replaced while the boat is afloat. This is done by withdrawing the means for receiving water pressure 10, until the end is within the chamber 22, closing valve 23, and removing nut 21 and gland 24 after which means for receiving water pressure 10 may be entirely removed from chamber 22 and thus it becomes easily accessible for clearing of obstruction. It may be again put in place while the boat is afloat by reversing the preceding process.

In order to reduce the pulsations due to variations in the water pressure as it is transmitted from the means for receiving water pressure 10 10, to the compensating chamber 16, the needle valve 13, is provided, and, by partly closing this valve, greater or less resistance to the passage of fluid pressure can be secured and thus a more uniform pressure and speed of the boat will be indicated on the indicating and recording gage 20. As the water pressure varies due to variation in speed of the boat, or rocking from side to side, the pulsations cannot readily pass through the partly closed needle valve and before the peak of the pulsations has passed through the partly closed needle valve the pressure has subsided and a depression has started. The valve 13 is best situated between the cushioning and compensating chambers, since better regulation is attained when the valve is not subjected to abrupt changes in pressure.

When the boat is lying quietly at anchor the water level rises in pressure tubing 12, and its connection, to the means for receiving water pressure or lower end of the compensating chamber 16; and at the same time the indicating and recording gage 20 will indicate its normal zero. But while remaining at anchor, if the boat rocks, the means for receiving water pressure 10 10, rise or fall causing variations in the water pressure that is acting in the compensating chamber 16, and as a result the indicating and recording gage 20 will show this variation, and, when a record is made, it indicates the approximate angle through which the boat rocks.

When the means for receiving water pressure 10 10, is placed at one side of the longitudinal axis of the boat as shown in Figure 2, the indicating and recording gage 20, shows the changes in the boat's course. Thus when only the means for receiving pressure 10, at the left of the longitudinal axis, when looking from the stern toward the bow as shown in Figure 2, is in use a greater than normal pressure or speed of the boat is shown on indicating and recording gage 20, when a V-bottom boat turns to the left; and a less than normal pressure or speed is shown when the boat turns to the right; and the approximate amounts of changes in courses are indicated. Thus, when the change in a course is 6 points of the compass a much greater increase above normal is shown than when the change is 3 points.

The cause of this change of pressure I believe is due principally to a change that occurs in the list of the boat. As the boat travels in a circular path it tips or lists toward the center of its circular path and thus one side of the boat becomes depressed below, and the other side becomes elevated above, its normal position. If the means for receiving water pressure is located on the side of the boat that becomes depressed as the boat travels in a circular path greater pressure is created due to the greater submergence and therefore a greater speed is indicated. Thus if the means for receiving water pressure is on the left, or port, side of the boat and the boat changes its course toward the left a speed greater than normal is indicated and when it turns to the right a speed less than normal is indicated. The use of a single means for receiving water pressure thus enables changes of courses and their right or left directions to be indicated. But when two means for receiving water pressure are in use changes in courses do not produce an increase in pressure since when listing occurs one means for receiving water pressure is depressed while the other is elevated and the connection between them receives a mean pressure. An indication of the direction or change of course, whether to the right or left is therefore not given, but whether the change is to the right or to the left a loss in speed which actually occurs is correctly indicated. This has the distinct advantage of showing the loss in speed that is produced for different changes in courses. By actual tests on large ships it has been found that when the rudder is forced hard over to its maximum angle of deflection the loss in speed may amount to 25% of the speed; whereas for a gradual turn with a 3° angle of rudder it may amount to 4%. The importance of this indication is noteworthy in many respects for navigation.

It is also important for a gunnery officer or seaman to know the loss of speed that is occurring and with my device and when two means for receiving water pressure are in use this loss of speed is shown on an indicating and recording gage that may be located even in a sealed and water-tight compartment of a boat from which compartment land or water is not visible. This instant indication in loss of speed which occurs by change in course is of great importance in gunnery for guidance in setting the vertical elevation and horizontal range of guns before firing. I believe this is the first time that this loss in speed for changes in courses has been determined by a practical method and the importance of it is apparent both for navigation of merchant ships and for both navigation and gunnery of war ships.

As an indicating means, a pressure gage may be used and commonly a recording gage is provided which contains a graduated chart that shows circumferentially units of time, for example twenty-four hours and radial graduations in speed of travel shown in miles per hour. The chart is revolved by clock-work and as the boat travels through the water an irregular ink line is produced which indicates and shows in record form for any given time the speed in miles per hour, changes in courses, the approximate amount of each change, and whether the boat is lying at anchor or traveling forward, observation of the recording pen or afterwards of the record made on the chart shows the approximate angle through which the boat rocks.

I claim:

1. In a system for indicating the speed of boats by hydraulic pressure, created by the travel of the boat, a recording gage, means for receiving hydraulic pressure, a pipe connecting the receiving means and gage, and a compensating chamber and a cushioning chamber connected to the pipe at separated points.

2. In a system for indicating the speed of boats by hydraulic pressure, created by the travel of the boat, a recording gage, means for receiving hydraulic pressure, a pipe connecting the receiving means and gage, a compensating chamber connected to the pipe, and an air-chamber connected to said pipe between the receiving means and the compensating chamber, said chambers being at substantially the same horizontal plane.

3. In a system for indicating the speed of boats by hydraulic pressure, created by the travel of the boat, a recording gage, a receiving means provided with an opening for receiving the hydraulic pressure, a pipe connecting the opening in the receiving means with the recording gage, a compensating chamber connected to the pipe between the receiving means and gage, and means constructed and arranged to fix the compensating chamber in different vertical positions, the pipe including flexible portions to permit the vertical adjustments of the compensating chamber.

4. In a system for indicating the speed of boats by hydraulic pressure, created by the travel of the boat, a recording gage, a receiving means provided with an opening for receiving the hydraulic pressure, a pipe connecting the opening in the receiving means with the recording gage, a compensating chamber and a cushioning chamber connected to the pipe at separated points between the receiving means and gage, and means constructed and arranged to fix said chambers in different vertical positions.

5. In a system for indicating the speed of boats by hydraulic pressure, created by the travel of the boat, a recording gage, a receiving means provided with an opening for receiving the hydraulic pressure, a pipe connecting the opening in the receiving means with the recording gage, a compensating chamber, and a cushioning chamber connected to the pipe, and means situated between the compensating chamber and cushioning chamber for controlling the flow of water through the pipe.

6. In a system for indicating the speed of boats by hydraulic pressure, created by the travel of the boat, an indicating device, situated on opposite sides of the longitudinal axis through the center of the boat, and equidistant from the bow of the boat, means for receiving the hydraulic pressure, and connections between the receiving means and the indicating device.

FRANK B. SANBORN.

Witnesses:
JOHN G. JERNBERG,
FRANCIS L. AULD.